(12) United States Patent
Barry

(10) Patent No.: US 7,757,906 B2
(45) Date of Patent: Jul. 20, 2010

(54) AIR MOVEMENT INDICATING DEVICE

(76) Inventor: Michael J. Barry, 12028 Waterside View Dr. #23, Reston, VA (US) 20194

( * ) Notice: Subject to any disclaimer, the term of this patent is extended or adjusted under 35 U.S.C. 154(b) by 672 days.

(21) Appl. No.: 11/417,819

(22) Filed: May 4, 2006

(65) Prior Publication Data

US 2007/0080178 A1    Apr. 12, 2007

Related U.S. Application Data

(60) Provisional application No. 60/678,540, filed on May 6, 2005.

(51) Int. Cl.
*B65D 83/20* (2006.01)
(52) U.S. Cl. .......... 222/402.13; 116/214; 222/175; 222/402.21
(58) Field of Classification Search ........... 222/402.13, 222/402.1, 175, 402.21, 402.15, 182; 116/214
See application file for complete search history.

(56) References Cited

U.S. PATENT DOCUMENTS

| | | | | |
|---|---|---|---|---|
| 3,648,905 A | * | 3/1972 | Kauder | 222/402.13 |
| 3,698,604 A | * | 10/1972 | Nigro | 222/402.13 |
| 3,998,775 A | * | 12/1976 | Taub | 524/106 |
| 4,106,697 A | * | 8/1978 | Sickles et al. | 239/690.1 |
| 5,186,118 A | * | 2/1993 | Stinson | 116/214 |
| 5,628,432 A | * | 5/1997 | Mosley | 222/175 |
| 5,944,238 A | * | 8/1999 | Stark | 224/148.4 |
| 7,416,192 B1 | * | 8/2008 | Feller | 280/19 |
| 2004/0188473 A1 | * | 9/2004 | Groh et al. | 222/402.13 |
| 2008/0098952 A1 | * | 5/2008 | Healy et al. | 116/214 |

\* cited by examiner

*Primary Examiner*—Kevin P Shaver
*Assistant Examiner*—Jonathan Wood
(74) *Attorney, Agent, or Firm*—Raymond M. Galasso; David O. Simmons; Galasso & Associates, L.P.

(57) ABSTRACT

A device comprises a container includes a dispensing mechanism for enabling pressurized dispensable contents contained within an interior space of the container to be selectively dispensed therefrom. A retention clip structure is attached to an exterior portion of the container and includes a clip portion that is biased to a closed configuration for enabling the clip portion to securely engage a portion of an article for attaching the container to the article. A cap assembly includes a cap body attached to the container and a trigger moveably attached to the cap body. The trigger includes a handle portion and a dispensing mechanism engagement portion attached to the handle portion. The handle portion is movable from a rest position to a displaced position for causing the dispensing mechanism actuation portion to act on the dispensing mechanism such that the pressurized dispensable contents are dispensed from within the interior space of the container.

7 Claims, 1 Drawing Sheet

AIR MOVEMENT INDICATING DEVICE

CROSS REFERENCE TO RELATED APPLICATIONS

This patent application claims priority to co-pending U.S. Provisional Patent Application having Ser. No. 60/678,540 filed May 6, 2005 entitled "Club Gauge", having a common applicant herewith and being incorporated herein in its entirety by reference.

FIELD OF THE DISCLOSURE

The disclosures made herein relate generally to devices and systems configured for identifying air movement and, more particularly, to handheld devices for identifying wind direction and relative wind speed.

BACKGROUND

People involved in many outdoor activities have a need to know what direction the wind is blowing and, optionally, a need to a qualitative speed of wind (i.e., relatively low air speed, relatively high air speed, etc). Examples of such outdoor activities include, but are not limited to, golfing, kite flying, model rocketry, model airplane flying, fishing and the like. For reasons specific to such outdoor activities, knowing the direction of the wind is important. Furthermore, in many situations, it is important to check the wind frequently because the direction of the wind can change in a relatively short period of time and/or be affected by nearby landscape features such as trees, buildings, hills and the like.

Therefore, a handheld device that provides a simple, effective, inexpensive and reliable means of determining direction of moving air and, optionally relative speed of the air would be advantageous, desirable and useful.

SUMMARY OF THE DISCLOSURE

In one embodiment of the present invention, an air movement indicating device comprises a container and a cap assembly. The container includes a nozzle assembly in fluid communication with an interior space of the container and including pressurized dispensable contents contained within the interior space. The nozzle assembly is biased to a closed configuration thereby preventing the pressurized dispensable contents from being dispensed through a nozzle of the nozzle assembly when the nozzle assembly is in the closed configuration. The nozzle assembly is selectively movable from the closed configuration to an open configuration for enabling the pressurized dispensable contents to be dispensed through the nozzle when the nozzle assembly is in the open configuration. The cap assembly includes a cap body attached to the container and a trigger moveably attached to the cap body. The trigger includes a handle portion and a nozzle actuation portion attached to the handle portion. Movement of the handle portion from a rest position to a displaced position causes the nozzle actuation portion to move the nozzle assembly from the closed orientation to the open orientation such that the pressurized dispensable contents are dispensed through the nozzle.

In another embodiment of the present invention, an air movement indicating device comprises a container, a cap assembly and a retention clip structure. The container includes a nozzle assembly in fluid communication with an interior space of the container and includes a propellant and color-laden particulate contained within the interior space of the container. The nozzle assembly is biased to a closed configuration thereby preventing the propellant from forcing the color-laden particulate through a nozzle of the nozzle assembly when the nozzle assembly is in the closed configuration. The nozzle assembly is selectively movable from the closed configuration to an open configuration for enabling the propellant to force the color-laden particulate through the nozzle when the nozzle assembly is in the open configuration. The cap assembly includes a cap body attached to the container and a trigger moveably attached to the cap body. The trigger includes a handle portion and a nozzle actuation portion attached to the handle portion. Movement of the handle portion from a rest position to a displaced position causes the nozzle actuation portion to move the nozzle assembly from the closed orientation to the open orientation such that the propellant forces the color-laden particulate through the nozzle. The retention clip structure is attached to an exterior portion of the container. The retention clip structure includes a clip portion that is biased to a closed configuration for enabling the clip portion to securely engage a portion of an article for attaching the container to the article.

In another embodiment of the present invention, an air movement indicating device comprises an aerosol can, a retention clip structure and a cap assembly. The aerosol can includes a dispensing mechanism for enabling pressurized dispensable contents contained within an interior space of the aerosol can to be selectively dispensed therefrom. The pressurized dispensable contents include a particulate-laden gas and the particulate is colored. The retention clip structure is attached to an exterior portion of the aerosol can. The retention clip structure includes a clip portion that is biased to a closed configuration for enabling the clip portion to securely engage a portion of an article for attaching the aerosol can to the article. The cap assembly includes a cap body attached to the aerosol can and a trigger moveably attached to the cap body. The trigger includes a handle portion and a dispensing mechanism engagement portion attached to the handle portion. The handle portion is movable from a rest position to a displaced position for causing the dispensing mechanism actuation portion to act on the dispensing mechanism such that the pressurized dispensable contents are dispensed from within the interior space of the aerosol can.

Turning now to specific aspects of the present invention, in at least one embodiment, the retention clip structure includes spaced apart attachment arms releasably engaged with a side face of the container and a protruding member engaged with an end portion of the container.

In at least one embodiment of the present invention, the cap assembly includes a cap body having an interior space, the nozzle is generally positioned within the interior space of the cap body, the cap body includes a nozzle port and an outlet portion of the nozzle is exposed within the nozzle port.

In at least one embodiment of the present invention, the container is cylindrical shaped, the nozzle assembly is attached to a first end portion of the cylindrical shaped container and a centerline axis of the outlet portion of the nozzle is skewed with respect to a longitudinal axis of the cylindrical shaped container.

In at least one embodiment of the present invention, the centerline axis of the outlet portion of the nozzle is skewed with respect to a longitudinal axis of the container.

In at least one embodiment of the present invention, the nozzle actuation portion of the trigger is located within the interior space of the cap body, the handle portion of the trigger is located outside of the interior space of the cap body and the handle portion extends along a side face of the container.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
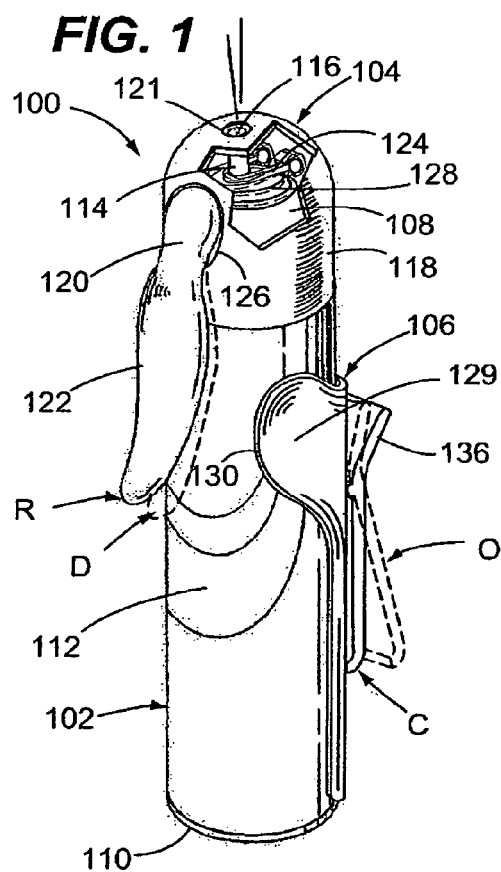
FIG. 1 is a perspective view of an air movement indicating device in accordance with a first embodiment of the present invention.
Figure 2:
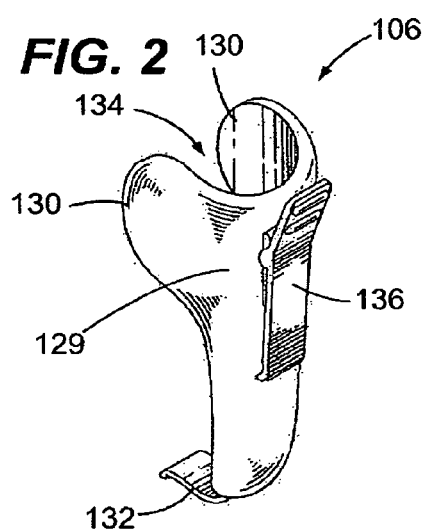
FIG. 2 is a perspective view of a retention clip structure of the air movement indicating device shown in FIG. 1.

FIGS. 1 and 2 depict various aspects of an air movement indicating device in accordance with a first embodiment of the present invention, which is referred to herein as the air movement indicating device 100. A person involved in an outdoor activities may use the air movement indicating device 100 to visually determine what direction air is moving and, optionally, qualitative speed of the air (i.e., relatively low air speed, relatively high air speed, etc). Examples of such outdoor activities include, but are not limited to, golfing, kite flying, model rocketry, model airplane flying, fishing and the like. Additionally, a person may use the air movement indicating device 100 indoors for identifying drafts, HVAC airflow characteristics and the like. The air movement indicating device 100 provides a simple, effective, inexpensive and reliable means of determining airflow movement direction and, optionally, relative speed.

The air movement indicating device 100 includes a container 102, a cap assembly 104 and a retention clip structure 106. The container 102 is a cylindrical can having a first end portion 108, a second end portion 110 (i.e., opposing end portions (108, 110)) and a side face 112 extending between the opposed end portions (108, 110). The cap assembly 104 is attached over the first end portion 108.

The container 102 includes a nozzle assembly 114 in fluid communication with an interior space of the container 102. A propellant and color-laden particulate are contained within the interior space of the container 102. Examples of propellants include, but are not limited to, compressed hydrocarbon gas, compressed air, compressed carbon dioxide gas and compressed nitrogen gas. Examples of the particulate include organic particulate and polymeric particulate. The propellant and color-laden particulate are one example of pressurized dispensable contents. A particulate-laden gas (e.g., a propellant with electrically charged particulate held in suspension) is another example of pressurized dispensable contents.

The nozzle assembly 114 is biased to a closed configuration thereby preventing the propellant from forcing the color-laden particulate through a nozzle 116 of the nozzle assembly 114 when the nozzle assembly 114 is in the closed configuration. The nozzle assembly 114 is selectively movable from the closed configuration to an open configuration for enabling the propellant to force the color-laden particulate through the nozzle 116 when the nozzle assembly 114 is in the open configuration. In this manner, the container 102 has pressurized dispensable contents contained therein. In one embodiment, such pressurized dispensable contents include a particulate-laden gas and the particulate is colored (e.g., pigmented, dyed, etc). In one embodiment, the container 102 and its constituent components are similarly configured as a conventional aerosol can.

The cap assembly 104 includes a cap body 118 and a trigger 120 movably attached to the cap body 118. The cap body 118 is attached to the container 102 at the first end portion 108 of the container 102. The nozzle 116 of the nozzle assembly 114 extends through a nozzle port 121 (i.e., an opening) in the cap body 118 such that an outlet portion of the nozzle 116 is exposed within the nozzle port 121. The trigger 120 includes a handle portion 122 and a nozzle actuation portion 124 attached to the handle portion 122. The nozzle actuation portion 124 of the trigger 120 is located within an interior space of the cap body 118 and is pivotably attached to the cap body 118. The handle portion 122 extends through an opening 126 in the cap body 118 such that it resides outside of the interior space of the cap body 118. The handle portion 122 extends along the side face 112 of the container 102. In one embodiment (shown), a centerline axis of the nozzle is skewed with respect to a centerline axis of the container 102 such as, for example, by about 15 degrees.

The nozzle actuation portion 124 of the trigger 120 is engaged with a flow control portion 128 of the nozzle 116. Movement of the handle portion 122 from a rest position R to a displaced position D results in the nozzle actuation portion 124 moving from a corresponding rest position to a corresponding displaced portion. Such movement of the nozzle actuation portion 124 from the rest position to the displaced portion results in the flow control portion 128 of the nozzle 116 to move the nozzle assembly 114 from the closed orientation to the open orientation such that the propellant forces the color-laden particulate through the nozzle 116.

The retention clip structure 106 includes a main body 129 having spaced-apart attachment arms 130 and a protruding member 132. A container-receiving channel 134 extends between the spaced-apart attachment arms 130. The protruding member 132 extends into the container-receiving channel 134. The spaced-apart attachment arms 130 engage respective portions of the side face 112 of the container 102 for securing the container 102 within the container-receiving channel 134. The protruding member 132 limits displacement of the container 102 within the container-receiving channel 134. The retention clip structure 106 includes a clip portion 136 that movable attached to the main body 129. The clip portion 136 is biased to a closed configuration C for enabling the clip portion 139 to securely engage a portion of an article for attaching the container 102 to the article. The clip portion 136 can be manually moved to an open configuration O. Biasing may be provided by, for example, a pivot-discrete spring arrangement or a molded-in spring portion.

Figure 3:
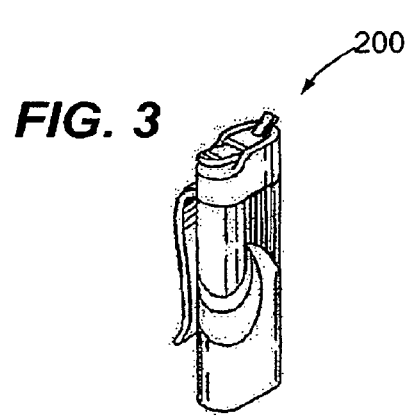
FIG. 3 is a perspective view of an air movement indicating device in accordance with a second embodiment of the present invention.

FIG. 3 depicts an air movement indicating device in accordance with a second embodiment of the present invention, which is referred to herein as the air movement indicating device 200. The overall construction and contents dispensing functionality of the air movement indicating device 200 is similar to that of a conventional disposable lighter. However, means for ignition are omitted. The air movement indicating device 200 includes pressurized dispensable contents (e.g., including colored particulate) as discussed above in reference to FIGS. 1 and 2.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An air movement indicating device, comprising:
    an aerosol can including a dispensing mechanism for enabling pressurized dispensable contents contained within an interior space of the aerosol can to be selectively dispensed therefrom, wherein the pressurized dispensable contents includes a particulate-laden gas, and wherein said particulate is colored, and wherein said particulate includes electrically charged organic particulate held in suspension within the propellant such that said particulate is electrically charged as it passes through and is delivered from within the dispensing mechanism;
    a retention clip structure attached to an exterior portion of the aerosol can, wherein the retention clip structure includes a clip portion that is biased to a closed configuration for enabling the clip portion to securely engage a portion of an article for attaching the aerosol can to the article; and
    a cap assembly including a cap body attached to the aerosol can and a trigger moveably attached to the cap body, wherein the trigger includes a handle portion and a dispensing mechanism actuation portion attached to the handle portion, wherein the dispensing mechanism actuation portion of the trigger is located entirely within the interior space of the cap body, wherein the handle portion of the trigger is connected to the actuation portion of the trigger through an opening in the cap body such that a majority of the handle portion is located outside of the interior space of the cap body, wherein the dispensing mechanism actuation portion is located within an interior space of the cap body and is pivotably attached thereto in a manner allowing relative movement of the dispensing mechanism actuation portion with respect to the cap body and in a manner whereby movement of the dispensing mechanism actuation portion with respect to the dispensing mechanism is entirely independent of relative position of the cap body with respect to the aerosol can, wherein the dispensing mechanism actuation portion includes spaced apart arms each pivotably attached to the cap body at a first end portion thereof and fixedly attached to the handle portion at a second end portion thereof, wherein a nozzle of the dispensing mechanism extends between said arms, wherein a flow control portion of the dispensing mechanism is engaged with said spaced apart arms, wherein a centerline axis of the outlet portion of the nozzle is skewed with respect to a longitudinal axis of the aerosol can when the nozzle is in a non-dispensing position, and wherein the handle portion is movable from a rest position to a displaced position with respect to the cap body for causing said spaced apart arms of the dispensing mechanism actuation portion to act on the flow control portion of the dispensing mechanism such that said pressurized dispensable contents are dispensed from within the interior space of the aerosol can.

2. The air movement indicating device of claim 1 wherein:
    the dispensing mechanism actuation portion extends over the flow control portion of the dispensing mechanism such that movement of the handle portion from the rest position to the displaced position causes the flow control portion to urge a nozzle assembly of the dispensing mechanism to an open orientation such that said pressurized dispensable contents are dispensed from within the interior space of the aerosol can; and
    the handle portion extends along a side face of the cylindrical shaped aerosol can.

3. The air movement indicating device of claim 1 wherein:
    a nozzle of the dispensing mechanism is generally positioned within the interior space of the cap body;
    the cap body includes a nozzle port;
    the nozzle port is a first opening in the cap body and the opening through which the handle portion of the trigger is connected to the dispensing mechanism actuation portion of the trigger is a second opening in the cap body different than the first opening in the cap body; and
    an outlet portion of the nozzle is exposed within the nozzle port.

4. The air movement indicating device of claim 3 wherein:
    the aerosol can is cylindrical shaped; and
    the dispensing mechanism is attached to a first end portion of the cylindrical shaped aerosol can.

5. The at movement indicating device of claim 4 wherein the retention clip structure includes:
    spaced apart attachment arms releasably engaged with a side face of the cylindrical shaped aerosol can; and
    a protruding member engaged with a second end portion of the cylindrical shaped aerosol can.

6. The air movement indicating device of claim 5 wherein the centerline axis of the outlet portion of the nozzle is skewed by about 15 degrees with respect to a longitudinal axis of the cylindrical shaped aerosol can.

7. The air movement indicating device of claim 4 wherein:
    the dispensing mechanism actuation portion extends over a flow control portion of the nozzle such that movement of the handle portion from the rest position to the displaced position causes the flow control portion to urge the dispensing mechanism to an open orientation such that said pressurized dispensable contents are dispensed from within the interior space of the aerosol can; and
    the handle portion extends along a side face of the cylindrical shaped aerosol can.

* * * * *